United States Patent [19]

Tajima et al.

[11] Patent Number: 4,786,992
[45] Date of Patent: Nov. 22, 1988

[54] APPARATUS AND METHOD FOR CONTROLLING TAPE TENSION USING ACCELERATION AND AVERAGE TENSION DEVIATION INFORMATION TO ADJUST MOTOR DRIVE CURRENTS

[75] Inventors: Fujio Tajima; Atsushi Ichikawa, both of Ibaraki; Hiroshi Maejima, Kanagawa; Munetake Kanna, Odawara, all of Japan

[73] Assignee: Hitachi, Ltd., Tokyo, Japan

[21] Appl. No.: 917,980

[22] Filed: Oct. 14, 1986

[30] Foreign Application Priority Data

Oct. 11, 1985 [JP] Japan ................. 60-226384
Apr. 25, 1986 [JP] Japan ................. 61-94525

[51] Int. Cl.⁴ .................. G11B 15/43; B65H 59/38
[52] U.S. Cl. .................. 360/73; 318/7; 242/75.44
[58] Field of Search .......... 360/71, 73; 318/6, 7; 242/75.5, 75.51, 186, 75.44

[56] References Cited

U.S. PATENT DOCUMENTS

| | | | |
|---|---|---|---|
| 3,606,201 | 9/1971 | Petusky | 318/7 |
| 3,781,490 | 12/1973 | Phillips | 242/75.5 |
| 3,809,335 | 5/1974 | Mantey | 242/186 |
| 4,125,881 | 11/1978 | Eige et al. | 318/7 |
| 4,278,213 | 7/1981 | Rubruck | 242/75.44 |
| 4,525,654 | 6/1985 | Tajima et al. | 242/75.51 |
| 4,531,166 | 7/1985 | Anderson | 318/7 |
| 4,540,920 | 9/1985 | Cutler et al. | 318/7 |

Primary Examiner—Raymond F. Cardillo
Assistant Examiner—David L. Robertson
Attorney, Agent, or Firm—Antonelli, Terry & Wands

[57] ABSTRACT

The invention relates to a tape transport mechanism in which two reels are respectively driven by different motors, thereby transporting a magnetic tape from one reel to another reel by passing through the portion of a read/write head without any variation in tension. At the initial stage to transport the magnetic tape, an acceleration time from a stop state of the tape until a tape speed reaches a reference speed and an average tension deviation to be applied to the magnetic tape during this time are obtained. Correction values to correct variations in run characteristics of two reel drive systems are calculated by use of the acceleration time and the average tension deviation. Upon next and the subsequent magnetic tape transport, currents to be supplied to the motors to drive two reels are controlled by use of the drive current command values corrected by those correction values.

49 Claims, 8 Drawing Sheets

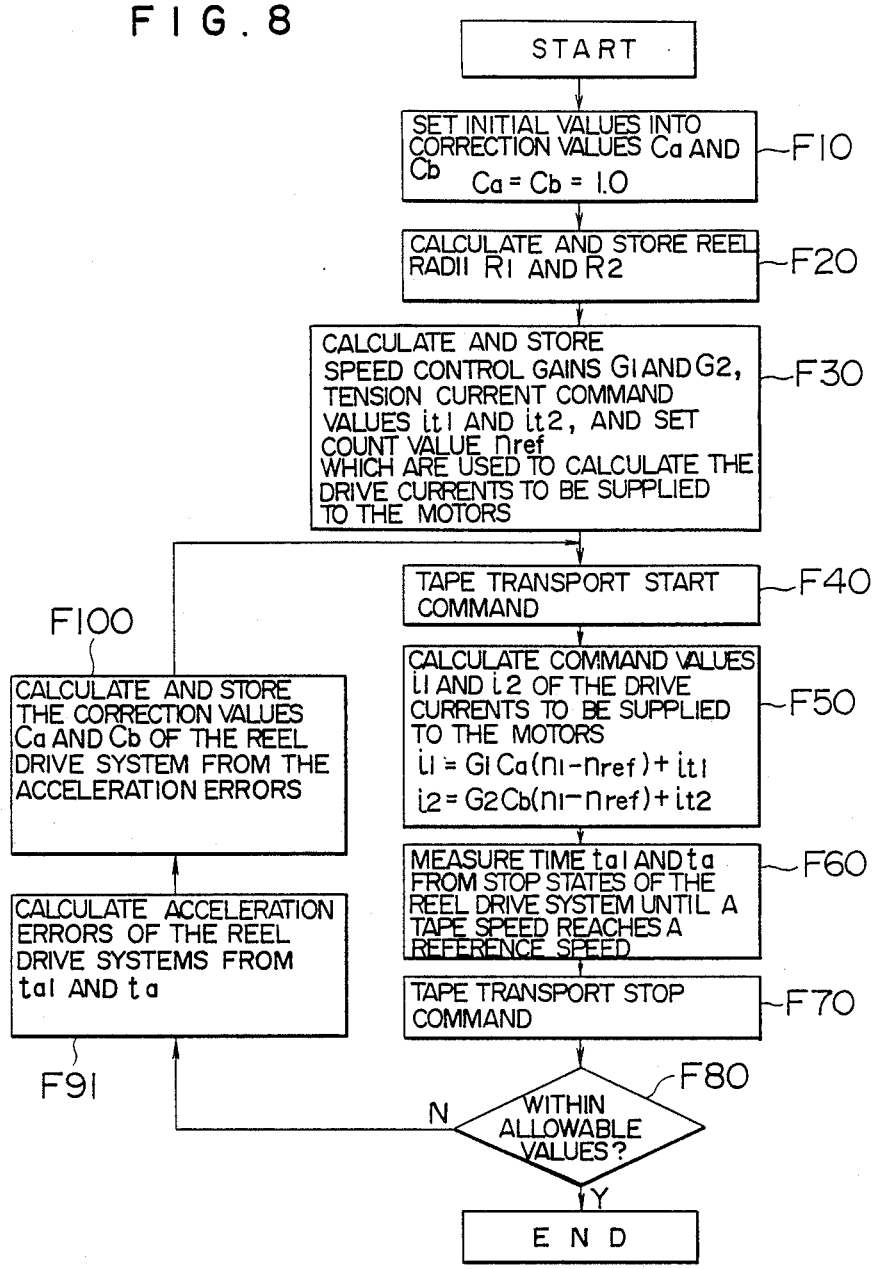

4,786,992

APPARATUS AND METHOD FOR CONTROLLING TAPE TENSION USING ACCELERATION AND AVERAGE TENSION DEVIATION INFORMATION TO ADJUST MOTOR DRIVE CURRENTS

BACKGROUND OF THE INVENTION

1. Field of the Invention

The present invention relates to an apparatus for directly transporting a tape (e.g., magnetic tape) from one reel to another reel and, more particularly, to a tape transport method and an apparatus suitable to transport a tape at a high speed and with a high degree of accuracy.

2. Description of the Prior Art

A conventional tape transport apparatus is disclosed in, for example, U.S. Pat. No. 4,125,881 issued on Nov. 14, 1978 and entitled "Tape motion control for real-to-reel drive". According to the apparatus disclosed in this U.S. Patent, the drive currents of respective motors to drive a supply reel and a take-up reel are calculated on the basis of the radius of tape wound around each reel and the drive currents are supplied to the respective motors, thereby allowing the speed and tension of the tape in a magnetic head portion to be maintained constant. On the other hand, to realize stable operation of the apparatus, the actual reel drive system needs to be the inherent system according to the design. This is because when the drive currents to be supplied to the motors for driving two reels are calculated, various kinds of set constants for use in the calculations, and the other set values and the like are determined on the basis of the set constants regarding the design reel drive system on the assumption that the actual drive system has been manufactured and can operate in accordance with the inherent design. However, in general, the actual reel drive system unfortunately differs from the system as designed because of variations in dimensions, characteristics, and performances of respective parts or due to various errors in assembly and the like. In particular, the tape transport apparatus has two reel drive systems to respectively drive two reels, so that the variations in performance, characteristics, and the like of two reel drive systems will become a serious obstacle to the stable tape transport between two reels. Such variations cause a fluctuation in tension (tape tension) which will be applied to the tape upon transport of the tape or makes it difficult to stably transport the tape at a high speed, and the like. Even if the quality is carefully managed, those variations in performance and characteristics will certainly occur. In general, to control the tape tension to a predetermined value, the tape tension is detected and compared with a set tension to obtain the tension error, and the drive currents to be supplied to the reel drive motors are corrected so as to eliminate the tension error in a feedback manner. The tape transport apparatus disclosed in U.S. Pat. No. 4,125,881 also controls the tape tension in a feedback control manner as mentioned above. However, it is difficult to maintain the tape tension to a predetermined value by such a feedback control. In particular, for the period when the reel is accelerated from the stop state to the state of a predetermined speed or for the period when the reel is stopped from the predetermined speed, a large tension variation occurs by the variations in performance and characteristics of two reel drive systems. Thus, the satisfactory tension control cannot be accomplished by the foregoing feedback control because of the operation time lag of the control system.

SUMMARY OF THE INVENTION

It is an object of the present invention to provide tape transport method and apparatus which can stably transport a tape between two reels.

Another object of the invention is to provide tape transport method and apparatus which can with high accuracy control the tension of tape to be transported between two reels.

Still another object of the invention is to provide a tape transport method and an apparatus in which drive commands are corrected to compensate for dispersion in characteristics of reel drive systems so as to achieve in a short time stable transportion of the tape.

According to one aspect of the invention, in a tape transport apparatus in which two reels are respectively driven by individual motors and a tape is transported from one reel to the other reel while passing through a read/write head station, this tape transport apparatus is provided with means for obtaining a deviation of the tension applied to the tape from a desired tension during the acceleration period from the stop state of the tape until the tape speed reaches a reerence speed when the tape is transported; means for calculating a correction value for compensating for deviation of the actual acceleration rates from the desired values thereof in respective reel drive systems by using the tension deviation thus obtained; and means for correcting drive currents to be supplied to the motors to drive the respective reels in the next tape transport on the basis of the calculated correction values.

According to another aspect of the invention, in a tape transport apparatus in which two reels are respectively driven by different motors and a tape is directly transported from one reel to another reel by passing through the portion of a read/write head, this tape transport apparatus is characterized by comprising: means for obtaining an acceleration time required for the tape to accelerate from the stop state to a reference speed and a deviation of tension of the tape during this acceleration time; means for calculating correction values to correct acceleration errors of respective reel drive systems by use of the time and tension deviation derived; and means for correcting drive command values of the motors to drive the reels in the next tape transport on the basis of the correction values.

According to still another aspect of the invention, the invention is characterized in that at the start of the tape, an acceleration time required for the tape to accelerate from the stop state to a predetermined reference speed and an average tension error of the tape during the acceleration time are obtained, acceleration errors of two reel drive systems are respectively calculated by use of two parameters of the acceleration time and average tension error, and drive command values for two reel drive systems are corrected so as to eliminate the respective acceleration errors.

BRIEF DESCRIPTION OF THE DRAWINGS

FIG. 8 is a flowchart of operations by a digital controller in FIG. 7.

DESCRIPTION OF THE PREFERRED EMBODIMENTS

The present invention will now be described in detail hereinbelow with respect to a practical embodiment.

Figure 1:
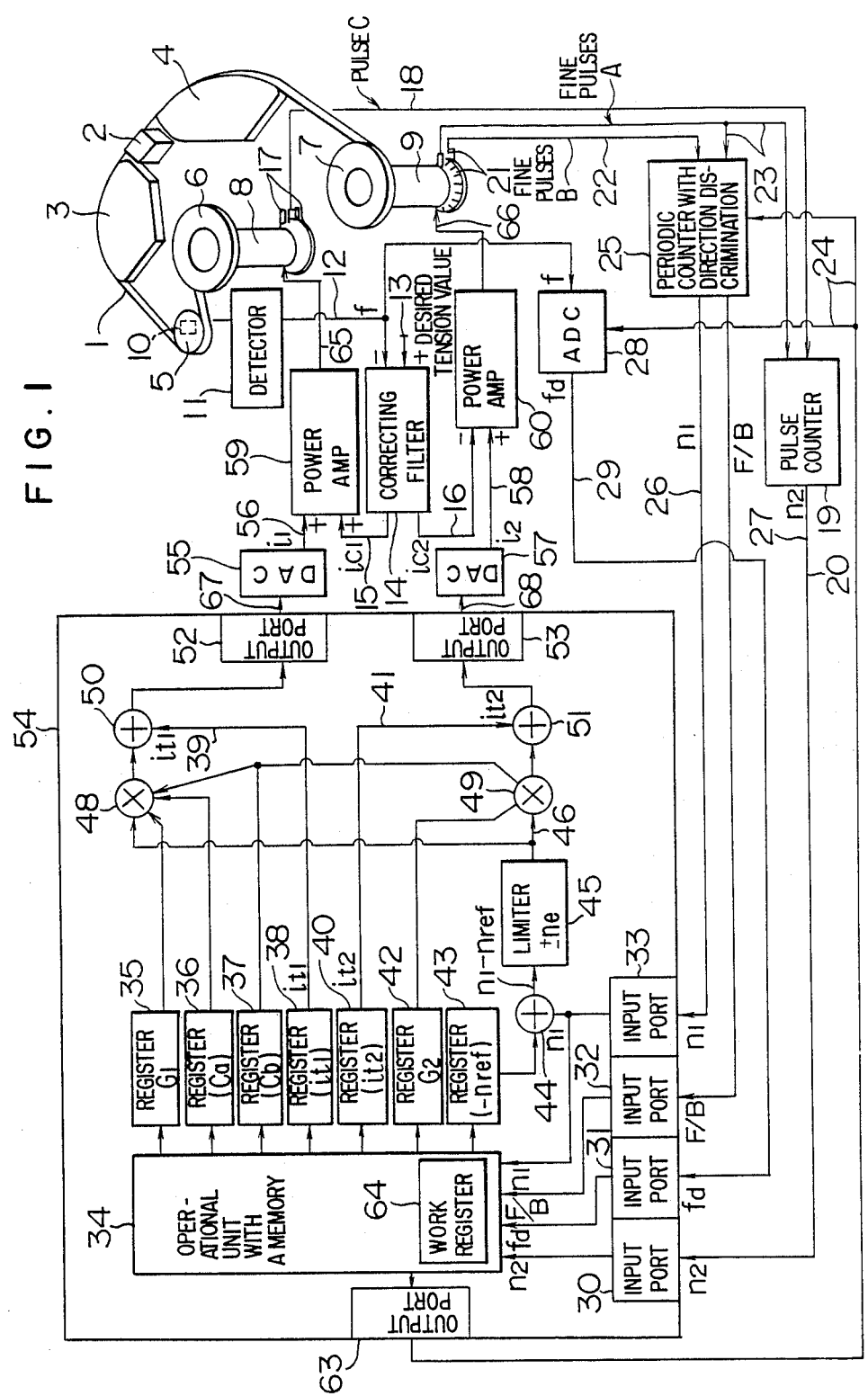
FIG. 1 is a block diagram showing a circuit arrangement in an embodiment of the present invention.

FIG. 1 is a block arrangement diagram showing an embodiment of the invention.

A tape transport apparatus of the embodiment does not have a tape buffer such as a vacuum column or the like. Instead, a digital controller 54 drives reel motors 8 an 9 by motor drive signals, which will be determined as will be explained hereinlater, thereby rotating reels 6 and 7. A magnetic tape 1 is fed from one of the reels and passes through a magnetic head 2 at a predetermined speed and is wound by another reel.

The reel motors 8 and 9 are driven by drive currents 65 and 66 which are output from power of amplifiers 59 and 60 consisting of constant current amplifiers, respectively. Inputs 56 and 58 to the power amplifiers 59 and 60 correspond to the outputs of D/A converters 55 and 57, respectively. The D/A converters 55 and 57 receive command values, as digital signals 67 and 68, of the drive currents to be supplied to the motors from the digital controller 54 through output ports 52 and 53 and convert the command values into analog signals and output them, respectively.

The digital controller 54 controls the motors 8 and 9 and also controls the reading and writing operations of the data from and onto the magnetic tape 1 by way of the magnetic head 2.

A suitable tachometer 17 is attached to the motor 8. The tachometer 17 generates one pulse C (18) for every rotation of the take-up reel 6 directly coupled with the motor 8 and transmits it to a pulse counter 19. A fine tachometer 21 is attached to the motor 9. The tachometer 21 similarly detects an amount of rotation of the supply reel 7 and generates fine pulses A (23) at a rate of N pulses each revolution of the supply reel 7 and transfers these pulses to a direction discriminative periodic counter 25 and to the pulse counter 19. The fine tachometer 21 also simultaneously generates fine pulses B (22) at the same rate as that of the fine pulses A, but leading or retarding in phase, depending on the direction of rotation of the reel 7, by electrical angle 90° from the fine pulses A (23) and supplies them to the counter 25. Therefore, the counter 25 can discriminate the rotational direction of the supply reel 7 by checking the phase relation between the fine pulses A and B. The counter 25 detects the moving direction of the magnetic tape 1 on the basis of the phase relation between the fine pulses A and B and sends a rotational direction signal 27 to an input port 32 of the digital controller 54. On the other hand, the counter 25 counts the period of the fine pulses A (23) using a clock 24 which are output from the digital controller 54 through an output port 63. Then, the counter 25 transfers a count value $n_1$ (26) to an input port 33 of the digital controller 54.

The pulse counter 19 outputs a count value n(20) indicative of the number of fine pulses A (23) per rotation of the take-up reel 6, namely, the rotational amount of the supply reel 7 and sends the count value $n_2$ (20) to an input port 30 of the digital controller 54.

A tension sensor 10 detects the pressure applied to the tape guide 5 due to the tension of the magnetic tape 1 and sends its output a detector 11, which produces an output indicative of the tape tension f (12) based on the output of the sensor 10 and supplies it to a correcting filter 14 and an A/D converter 28. The correcting filter 14 receives a desired tension value 13 and feeds back a correction signal $i_{c1}$ (15) to the power amplifier 59 on the side of the take-up reel so that the tape is moved with a predetermined tension held. The correcting filter 14 also feeds back a correction signal $i_{c2}$ (16) to the power amplifier 60 on the side of the supply reel. The A/D converter 28, on the other hand, samples the measured value f (12) of the tape tension and converts into the digital signal by use of the clock (24) which is supplied from the digital controller 54 through the output port 63. The A/D converter 28 then outputs a tape tension measured value $f_d$ (29) and sends it to an input port 31 of the digital controller 54.

The input ports 30 to 33 are provided in the digital controller 54. The input ports 30 to 33 receive the signals $n_2$ (20), $f_d$ (29), F/B (27), and $n_1$ (26) which are transmitted from the outside and transfer them to an operational unit 34 having a memory therein. The operational unit 34 has a function to control the whole digital controller 54 and drives the reel motors 8 and 9 to rotate the reels 6 and 7. The operational unit 34 determines drive currents to be supplied to the reel motors in order to control the speed and tension of magnetic tape 1 when it passes through the magnetic head 2 to predetermined desired values. The operational unit 34 calculates control constants necessary to determine the drive currents to be supplied to the reel motors by use of the input data which is sent from the input ports 30 to 33 and the mechanism characteristic data which have previously been stored in the memory. The respective control constants as the outputs of the operational unit 34 are supplied to registers 35, 36, 37, 38, 40, 42, 43 at proper timings, thereby updating the control constants, respectively. The data signal (26) sent to the input port 33 is supplied to the operational unit 34 and an adder 44. On the other hand, the adder 44 adds the output $(-n_{ref})$ from the register 43 to the output from the input port 33 and supplies the resultant data $(n_1 - n_{ref})$ to a limiter 45, which produces an output which is equal to $(n_1 - n_{ref})$ when $(n_1 - n_{ref})$ does not exceed a predetermined upper value $n_l$ and to $n_l$ when $(n_1 - n_{ref})$ exceeds $n_l$. The limiter 45 transmits the output (46) to multipliers 48 and 49. The multiplier 48 receives the outputs of the limiter 45 and registers 35 to 37 and multiplies these output signals and then transfers the multiplied output to an adder 50. The adder 50 receives the outputs of the multiplier 48 and register 38 and adds these output signals and supplies the command value of the drive current, as the multiplied output, to be supplied to the motor 8 to the output port 52. The multiplier 49 receives the outputs of the limiter 45 and registers 37 and 42 and multiplies these output signals and then sends the multiplied output to an adder 51. The adder 51 receives the outputs of the multiplier 49 and register 40 and adds these output signals and then transmits the command value of the drive current, as the multiplied output, to be supplied to the motor 9 to the output port 53.

A work register 64 is provided in the operational unit 34. The time from the stop state of the tape when it is transported until the tape speed reaches a reference speed and the limit value to discriminate whether a deviation of tension of the tape during this period falls within an allowable range or not is set in the work register 64.

In FIG. 1, numerals 3 to 5 denote tape guides.

Figure 2:
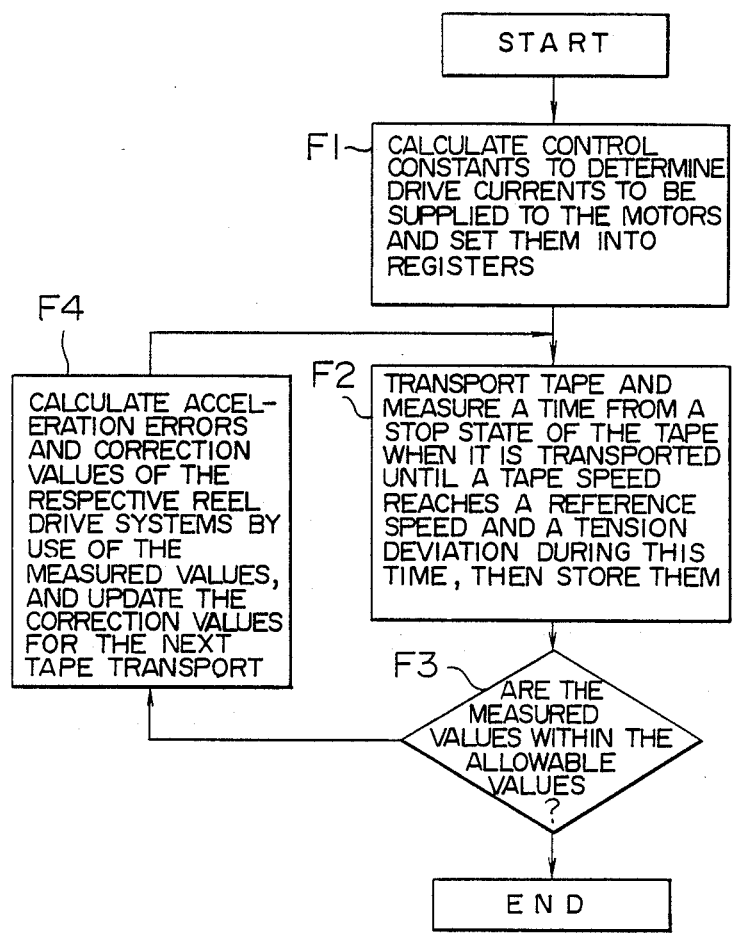
FIG. 2 is a flowchart of the operations of a digital controller in FIG. 1.

The operation of the apparatus in FIG. 1 will now be described with reference to FIG. 2. FIG. 2 is an operation flowchart showing the operation in the digital controller 54.

First, the process in step F1 in FIG. 2 is executed. In this step, control constants for use in the calculation of the drive currents to be supplied to the respective motors are set into the registers. The content of step F1 will be described in detail in conjunction with steps F10 to F30 in FIG. 3, which will be explained hereinlater.

In the next step F2, the tape is transported once for obtaining values of necessary parameters. That is, during transport of the tape, the accelelation time required for the tape to accelerate from the stop state to a predetermined reference speed and a deviation of tension of the tape from its desired value during the acceleration time are measured. Measured values of the tape tension are sampled at predetermined time intervals and stored into the memory together with the value of the measured acceleration time. In particular, the tension deviation is necessarily measured because it is very important in connection with a damage of tape. The content of step F2 will be explained in detail in conjunction with steps F40 to F70 in FIG. 3, which will be explained hereinlater.

After completion of the process in step F2, step F3 follows. In step F3, a check is made to determine whether or not the tape tension exceeds a predetermined limit (allowable) value based on the stored values thereof in step F2. If the tape tension is within the allowable value, the subsequent correcting operation is not executed. If the tape tension exceeds the allowable value, step F4 follows. The content of step F3 will be explained hereinafter in detail in conjunction with steps F80 and F90 in FIG. 3.

In step F4, acceleration errors of the respective reel drive systems and their correction values are calculated by use of the measured values derived in step F2. When the tape is then transported, those correction values are updated so that the drive currents to be supplied to the respective motors can be corrected on the basis of the correction values. The content of step F4 will be described in detail in conjunction with steps F95 to F120 in FIG. 3, which will be explained hereinafter.

The operation flow in the digital controller 54 in FIG. 1 will now be described further in detail hereinbelow with reference to FIG. 3.

Figure 3:
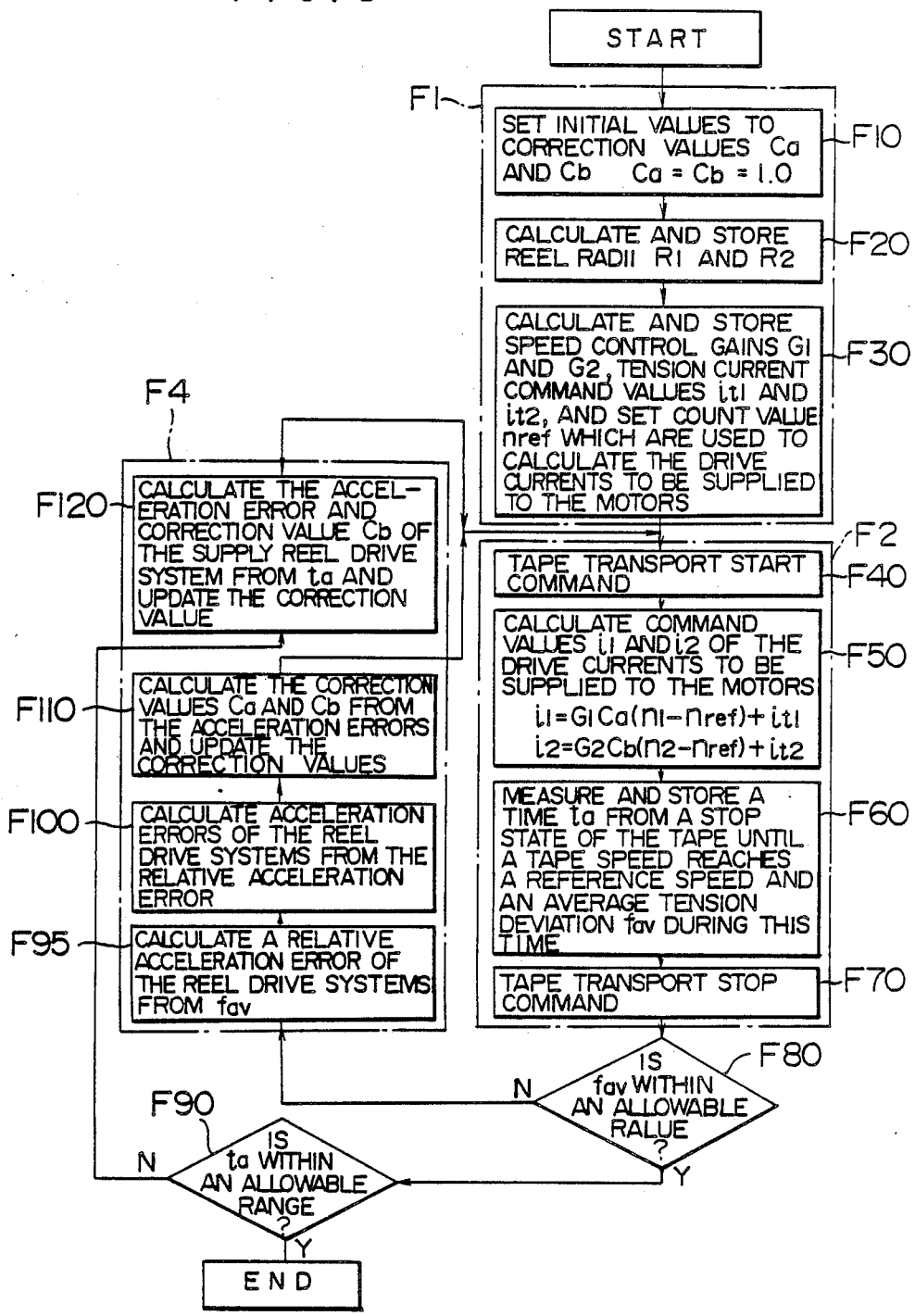
FIG. 3 is s a flowchart of detailed operations by the digital controller in FIG. 1.

First, the process in step F10 in FIG. 3 is executed. In step F10, the operational unit 34 sets $C_a = 1.0$ into the register 36 and sets $C_b = 1.0$ into the register 37. In the next step F20, the operational unit 34 calculates radii $R_1$ and $R_2$ of the reels 6 and 7 and stores them. Although these radii may be obtained by any algorithm, they are calculated in the following manner in this example. Since the length of tape which is wound by the take-up reel 6 per rotation thereof is equal to the length of tape which was fed out by the supply reel 7, the following expression (1) is satisfied. In addition, since the tape length doesn't change, the sum of the tape lengths wound around both supply and take-up reels is constant, so that expression (2) is satisfied.

$$2\pi R_1 = 2\pi R_2 \cdot \frac{n_2}{N} \tag{1}$$

$$\pi(R_1^2 - R_0^2) + \pi(R_2^2 - R_0^2) = LT \tag{2}$$

where,
$R_1$: radius of the reel 6
$R_2$: radius of the reel 7
$n_2$: count value (20) of the pulse counter 19
$N$: number of pulses per rotation of the fine tachometer 21
$R_0$: radius of each reel when no tape is wound
$L$: length of tape
$T$: thickness of tape By solving two expressions (1) and (2) each reel can be determined as shown in expressions (3), in which the count value $n_2$ (20) is used as a variable.

$$\left. \begin{array}{l} R_1 = \dfrac{n_2}{N} \cdot R_2 \\[2ex] R_2 = \left( \dfrac{2R_0^2 + \dfrac{LT}{\pi}}{1 + \left(\dfrac{n_2}{N}\right)^2} \right)^{\frac{1}{2}} \end{array} \right\} \tag{3}$$

The operational unit 34 calculates the radius of each reel by calculating expressions (3). This calculation is performed each time the new count value $n_2$ is input through the input port 30. The constants of $R_0$, L, T, and N necessary for this calculation (namely, a part of the data in the mechanism section) are preliminarily stored in the internal memory.

In the subsequent step F30, speed control gains $G_1$ and $G_2$ for use in calculation of the drive currents to be supplied to the respective motors, tension current command values $i_{t1}$ and $i_{t2}$, and a set count value $n_{ref}$ corresponding to the angular velocity which is required to set the tape speed to a set speed $V_0$ are calculated by use of the radii $R_1$ and $R_2$ derived by the calculation. Then, the resultant values are set into the registers. Namely, $G_1$ is set into the register 35, $G_2$ is set into the register 42, $i_{t1}$ is set into the register 38, $i_{t2}$ is set into the register 40, and $-n_{ref}$ is set into the register 43, respectively. The respective parameters in this embodiment are obtained in the following manner.

First, the control gains which are set into the registers 35 and 42 are obtained from expressions (4) and (5).

$$G_1 = \frac{C_0}{R_1 K_T} \left( J_1 + \frac{1}{2} \alpha(R_1^4 - R_0^4) \right) \tag{4}$$

$$G_2 = \frac{C_0}{R_2 K_T} \left( J_2 + \frac{1}{2} \alpha(R_2^4 - R_0^4) \right) \tag{5}$$

where,
$G_1$: speed control correction gain of the motor 8
$G_2$: speed control correction gain of the motor 9
$C_0$: constant determined depending on the characteristics in control response of the system $K_T$: motor torque constant
$J_1$: inertia of the take-up reel when no tape is wound
$J_2$: inertia of the supply reel when no tape is wound
$\alpha$: constant of the magnetic tape The operational unit 34 calculates $G_1$ and $G_2$ from expressions (4) and (5) using $C_0$, $K_T$, $J_1$, $J_2$, $\alpha$, and $R_0$ from among the mechanism section data previously stored in the memory and using the data of the reel radii $R_1$ and $R_2$ stored in the memory. The operational unit 34 then transmits the resultant values to the registers 35 and 42. These values are updated each time the reel radii $R_1$ and $R_2$ in the operational unit are rewritten.

The control constants which are set into the registers 38 and 40 are then obtained from expressions (6) and (7).

$$i_{t1} = \frac{1}{K_T}(R_1 \cdot f_{ref} + F) \quad (6)$$

$$i_{t2} = \frac{-1}{K_T}(R_2 \cdot f_{ref} + F) \quad (7)$$

where,
$i_{t1}$: current command value to the motor 8 for generation of $f_{ref}$
$i_{t2}$: current command value to the motor 9 for generation of $f_{ref}$
$f_{ref}$: desired tape tension value
F: frictional force (the sign changes in accordance with the running direction)

The operational unit 34 with a memory calculates $i_{t1}$ and $i_{t2}$ from expressions (6) and (7) by use of $K_T$, $f_{ref}$, and F from among the mechanism section data previously stored in the memory and the data of reel radii $R_1$ and $R_2$ stored in the memory and transmits the resultant values to the registers 38 and 40, respectively. These values are updated each time the reel radii $R_1$ and $R_2$ stored in the memory in the operational unit are rewritten.

The value of $-n_{ref}$ to be set into the register 43 is derived from the following expression (8).

$$n_{ref} = \frac{2\pi R_2}{NV_0 t_d} \quad (8)$$

where,
$n_{ref}$: number of clock pulses within the pulse period of the tachometer 21 in the case of the radius $R_2$ (value corresponding to the angular velocity which is required to set the tape speed to a desired speed $V_0$)
$V_0$: desired tape speed value
$t_d$: period of the clock pulse The operational unit 34 calculates $n_{ref}$ from expression (8) and adds the minus sign to the resultant value and sets into the register 43. This calculation is executed each time the radius $R_2$ is updated.

In the next step 40, when a tape transport start command is generated, step F50 follows.

In step F50, command values $i_1$ and $i_2$ of the drive currents to be supplied to the respective motors are calculated and output through the respective output ports 52 and 53. The calculation will be executed in the following manner.

$$i_1 = G_1 \cdot C_a(n_1 - n_{ref}) + i_{t1} \quad (9)$$

$$i_2 = G_2 \cdot C_b(n_1 - n_{ref}) + i_{t2} \quad (10)$$

However, at this stage, since $C_a = C_b = 1.0$ (refer to step F10), $C_a$ and $C_b$ are not corrected.

Figure 4:
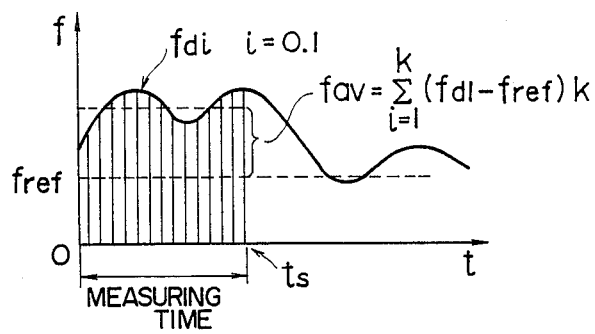
FIG. 4 is a diagram for explaining the operation of an average value of deviations of the tension applied to a tape.

By generating the command values $i_1$ and $i_2$ of the drive currents to be supplied to the respective motors, the corresponding reels are driven. At this stage, the digital controller 54 measures a time $t_a$ from the stop state of the tape until the tape speed reaches a predetermined reference speed $V_s (\leqq = V_0)$ and an average tension deviation $f_{av}$ of the tape within this time. Practically speaking, $t_a$ and $f_{av}$ are measured by the following method. First, the method of obtaining the time $t_a$ from the start of actuation of the tape until the tape speed reaches the reference speed $V_s$ will be explained. Since the count value $n_1$ indicative of the tape speed is input to the operational unit 34, the count value $n_1$ is compared with a count value $n_s$ corresponding to the reference speed $V_s$ previously stored and the time until the value of $n_1$ becomes smaller than or equal to the value of $n_s$ (namely, $n_1 \leqq n_s$) is measured by use of the internal clock. The resultant measured time is $t_a$. The average tension deviation $f_{av}$ can be obtained using a detected tension value $f_d$ which is input to the operational unit 34. FIG. 4 shows a detection state in this case. Since the desired tension value $f_{ref}$ is previously known (stored in the memory), the value of $f_{ref}$ is subtracted from the detected tension value $f_{di}$ which is input at every sampling time and the resultant values are added. Next, by dividing the added value by the number k of samples, the average tension deviation $f_{av}$ is obtained. After the digital controller 54 stored the measured values $t_a$ and $f_{av}$ into the memory and executed the process in step F60, it advances to step 70 and stops the tape transport.

A relative acceleration error of the respective reel drive systems can be obtained from $f_{av}$ and an acceleration error of the supply reel drive system can be derived from $t_a$ on the basis of the following theoretical ground.

Actual accelerations $\ddot{x}_1$ and $\ddot{x}_2$ which are caused in the take-up reel and supply reel drive systems can be expressed as follows.

$$\ddot{x}_1 = K_0 \beta_1 = \frac{K_0}{C_a} \quad (11)$$

$$\ddot{x}_2 = K_0 \beta_2 = \frac{K_0}{C_b} \quad (12)$$

where,
$K_0$: set acceleration
$\beta_1$: acceleration error coefficient of the take-up reel drive system
$\beta_2$: acceleration error coefficient of the supply reel drive system The tension deviation $f_s$ which is generated when the reels 6 and 7 rotate at the accelerations $\ddot{X}_1$ and $\ddot{X}_2$ is obtained by the following expression (13).

$$\left(\frac{1}{2}\ddot{x}_1 t^2 - \frac{1}{2}\ddot{x}_2 t^2\right) K_s = f_s \quad (13)$$

where,
t: time after the acceleration was started
$K_s$: spring constant of the tape The coefficients $\beta_1$ and $\beta_2$ in expressions (11) and (12) are the values which are obtained by summarizing the characteristic errors of the respective reel drive systems and linear approximating them as the acceleration errors. Expression (14) is obtained from expressions (12) and (13).

$$\beta_1 - \beta_2 = \frac{2}{K_0 K_s t^2} f_s \quad (14)$$

From expression (14), the relative acceleration error $\beta_1-\beta_2$ of the respective reel drive systems can be obtained by measuring the tension deviation $f_s$. However, since the tension deviation $f_s$ includes disturbances such as measurement errors and vibration of the mechanism section and the like, the reliability of the data is low. Therefore, the average value $f_{av}$ of the tension deviation $f_s$ is used.

Next, there is the relation of the following expression (15) between the time $t_s (=V_0/K_0)$ until the tape speed reaches the reference speed $V_s$ by accelerating the tape at the set acceleration $K_0$ and the time $t_a$ when the tape speed actually reaches $V_s$.

$$K_0 \beta_2 t_a = V_s = K_0 t_s \quad (15)$$

From expression (15), $\beta_2$ will be $$\beta_2 = \frac{t_s}{t_a} \quad (16)$$

From expression (16), by measuring the time $t_a$, the acceleration error of the supply reel drive system can be obtained.

In step F80, the digital controller 54 checks to see if the average tension deviation $f_{av}$ exceeds the limit value (allowable value) or not. If it exceeds the allowable value, step F95 follows. In step F95, the digital controller 34 corrects the relative acceleration error between the reel drive systems as will be explained hereinafter. If $f_{av}$ is within the allowable range, step F90 follows and a check is made to see if the time $t_a$ exceeds the allowable value or not. If $t_a$ exceeds the allowable value, step F120 follows and the correction is made so as to make the acceleration of each of the reel drive systems coincide with the set acceleration as will be explained hereinafter. If it is within the allowable range, the correcting operation is not executed any more. When the processing routine advances to step F95 by the single operation of the tape, the relative acceleration error $\beta_1-\beta_2$ between the reel drive systems is calculated using $f_{av}$ which has already been obtained. This calculation is performed on the basis of expression (14).

In the next step F100, the relative acceleration error $\beta_1-\beta_2$ is set to the acceleration errors $\beta_1$ and $\beta_2$ of the respective reel drive systems. In this process, there are two embodying formats and the content of one of them will be explained in detail in conjunction with steps F101 to F105 in FIG. 5a, which will be described hereinafter. The content of another embodying format will be explained in detail in conjunction with steps F101 to F109 in FIG. 5b, which will be explained hereinlater.

Figure 5A:
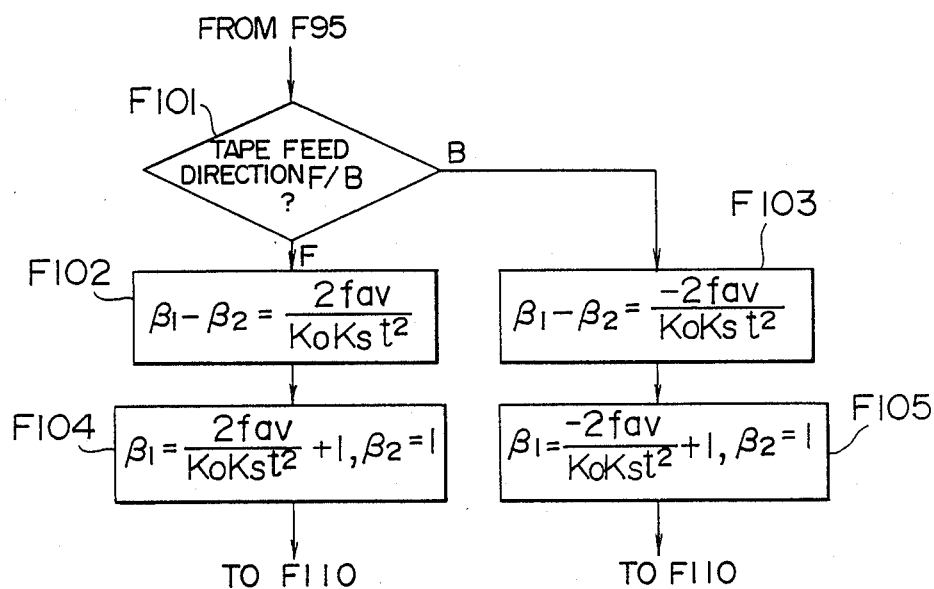
FIG. 5a is a flowchart of detailed operations at step F100 in FIG. 3.

In step F101 in FIG. 5a, the tape feed direction which has previously been set is referred. This is because the sign of the value $f_{av}$ is inverted depending upon the tape feed direction. In steps F101 to F103, the relation between the relative acceleration error $\beta_1-\beta_2$ in expression (14) and $f_{av}$ is corrected. If the tape is fed from the reel 7 to the reel 6, the tape feed direction is F, so that step F102 follows and the sign of expression (14) is not changed. In the case of the opposite direction, step F103 follows and the sign of expression (14) is inverted. In steps F104 and F105, the calculations are performed by setting $\beta_2=1$ and the relative acceleration error $\beta_1-\beta_2$ is all set to $\beta_1$. On the other hand, in steps F101 to F103 in FIG. 5b, the same processes as those in FIG. 5a are executed. In steps F106 and F107, the sign of $f_{av}$ is referred and if $f_{av}>0$ when the tape feed direction is F and if $f_{av}<0$ when the tape feed direction is B, $\beta_1>\beta_2$. Therefore, the calculations are performed by setting $\beta_2=1$ and the relative acceleration error $\beta_1-\beta_2$ is set to $\beta_1$ having a larger acceleration error.

In the other cases, $\beta_2>\beta_1$ and the calculations are performed by setting $\beta_1=1$ and the relative acceleration error $\beta_1-\beta_2$ is set to $\beta_2$ having a larger acceleration error.

After completion of the process in step F100, step F110 follows. In step F110, the correction values of the respective reel drive systems are obtained using the acceleration error and the correction values are stored. In this embodiment, the reciprocal numbers $C_a(=1/\beta_1)$ and $C_b(=1/\beta_2)$ of $\beta_1$ and $\beta_2$ are set into the registers 36 and 37, respectively. In step F40, the command values $i_1$ and $i_2$ of the drive currents of the respective reel motors after the correction are calculated using those set parameters. The tape is actually operated on the basis of the resultant command values $i_1$ and $i_2$. The command values of the drive currents obtained in this manner serve to correct those drive currents on the basis of variations in characteristics of the actual drive reel systems and nearly the optimum correction is attained. Therefore, at this stage, the tape tension is controlled to a value near a desired set value.

Next, the digital controller 54 performs the second operation of the tape by the new correction values. In the second tape operation, the tension deviation is corrected to a small value by the correction value $C_a$. Thus, step F90 follows step F80. If the time $t_a$ exceeds the allowable value, step F120 is executed. In step F120, the acceleration error $\beta_2$ of the supply reel drive system is calculated from time $t_a$ on the basis of expression (16). The correction value $C_b$ is obtained from the acceleration error $\beta_2$ and stored. In the embodiment in which step F100 in FIG. 3 is executed in FIG. 5a, the reciprocal number of $\beta_2$ is set to $C_b(=1/\beta_2)$ into the register 37. On the other hand, in the embodiment in FIG. 5b, the product of the value stored in the register 37 and the reciprocal number of $\beta_2$ is set to $C_b$. In the next step F40, the tape is again operated by the new correction value. At this stage, the acceleration characteristic is controlled to a value near a desired set value.

The result of the actual operation after the correction is monitored in steps F80 and F90. Even at this stage, if the correction is insufficient, the processes in steps F95 to F120 and the processes in steps F40 and F50 based on the result are further carried out.

The embodiment has the feature such that two parameters $t_a$ and $f_a$ are detected in two steps in the process to extract the characteristic errors of the reel drive systems. Since the tape speed and tension are the characteristics which are concerned with each other, in particular, if the characteristic errors are large, they will be adversely influenced by each other, so that the detection accuracies of $t_a$ and $f_a$ will deteriorate. Therefore, the embodiment intends to solve such a deterioration. The embodiment has the advantages such that since the characteristic errors of the reel drive systems are extracted in two steps, the detection accuracies of these errors are improved and the characteristic errors can be more properly corrected.

Figure 5B:
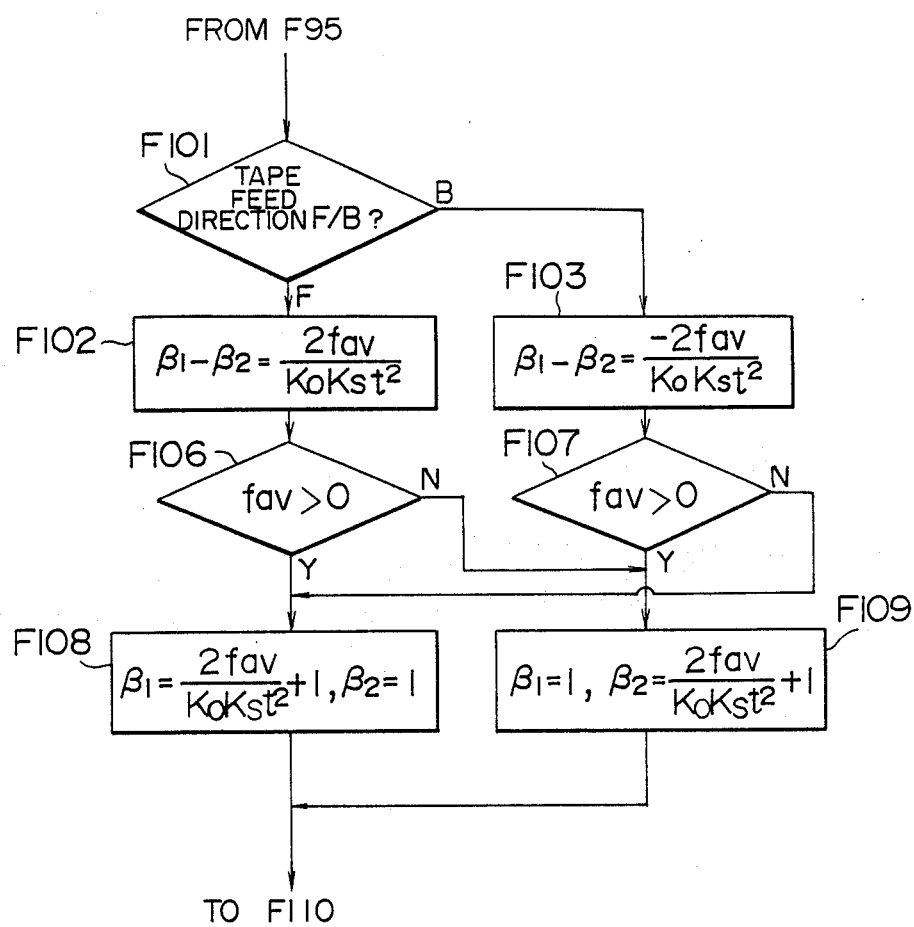
FIG. 5b is a flowchart of detailed operations at step F100 in FIG. 3 in another embodiment.

In the above embodiment, if the processes in FIG. 5b are executed in step F100 in FIG. 3, the larger acceleration error is selected and the correction value is calculated in each of the reel drive systems. Thus, both of the drive currents to be supplied to the motors are corrected so as to be reduced. Therefore, in the process to correct the errors due to the variations in characteristics, there is the advantage such that it is possible to prevent the phenomena such that an overcurrent is applied to only one of the motors and the like.

Figure 6:
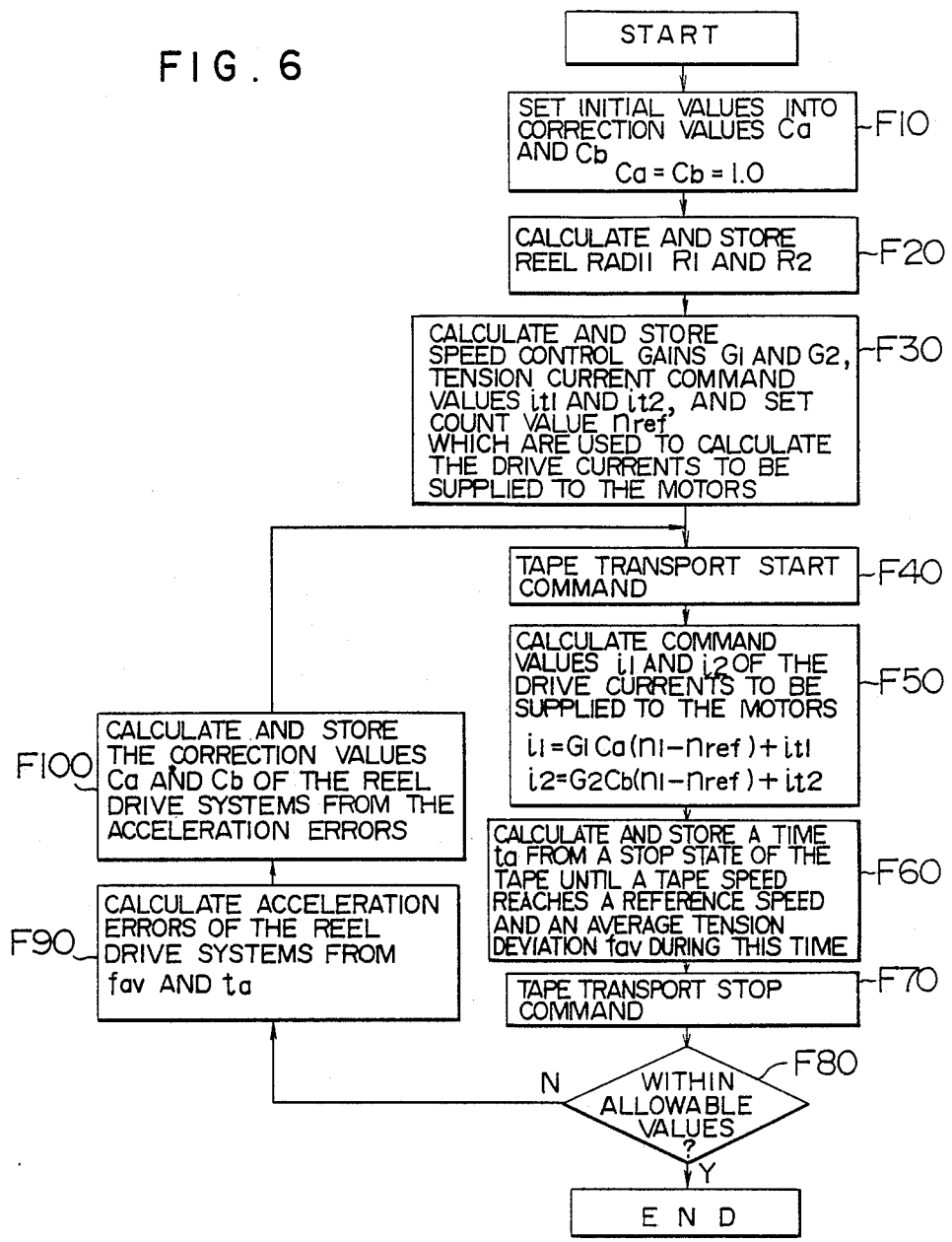
FIG. 6 is a flowchart of operation of a digital controller in another embodiment of the invention.

FIG. 6 is an operation flowchart showing another embodiment of the invention. Since a block arrangement diagram in this embodiment is similar to FIG. 1, its description and the diagram are omitted here. In FIG. 6, since the operations in steps F10 to F80 are similar to those in FIG. 3, their descriptions are omitted. In step F80, if the average tension deviation $f_{av}$ exceeds the allowable value, step F90 follows. The processes in steps F90 and F100 are then executed. After completion of these processes, upon the next tape transport, the command values $i_1$ and $i_2$ of the drive currents corrected in step F50 are calculated by use of the correction values $C_a$ and $C_b$ derived by those processes, thereby controlling the motors to drive the reels. Thus, the tension deviation to be applied to the tape can be controlled to a value within an allowable value. In the embodiment in FIG. 6, the correction values $C_a$ and $C_b$ are all together calculated from $f_{av}$ and $t_a$. Only this point differs from the case of FIG. 3.

Figure 7:
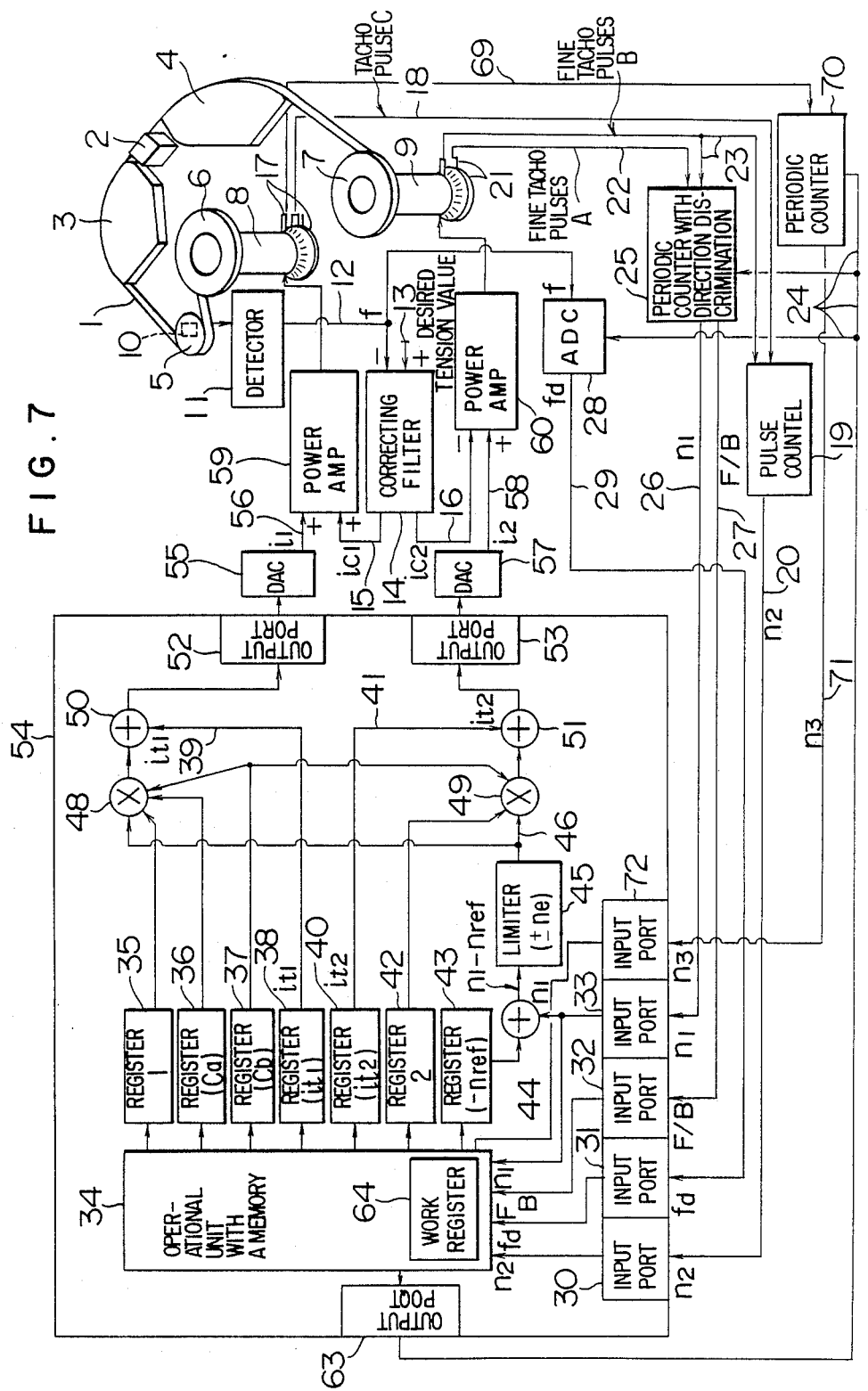
FIG. 7 is a block diagram showing circuit arrangement in another embodiment of the invention.

FIG. 7 is a block arrangement diagram according to another embodiment of the invention. FIG. 8 shows an operation flowchart for this embodiment. FIG. 7 is almost similar to FIG. 1.

FIG. 7 differs from the arrangement in FIG. 1 with respect to the following points. Namely, the tachometer 17 was modified so that it can detect fine pulses 69 as well as the pulses C (18). The fine pulses of the tachometer 17 are sent to a periodic counter 70. The periodic counter 70 receives the clocks (24) and counts the period of the fine pulses 69 and supplies a count value $n_3$ (71) to an input port 72 of the digital controller 54. The operational unit 34 with the memory receives the count value $n_3$ which is transmitted from the input port 72. The other arrangement is the same as that in FIG. 1.

FIG. 7 also differs from FIG. 1 with regard to the point that parameters $t_{a1}$ and $t_a$ are used to extract the characteristic errors of the reel drive systems. FIG. 8 is a flowchart showing the processes to determine the correction values in this embodiment. In the flowchart, the processes until the tape is operated are the same as the first embodiment (FIG. 3); therefore, their descriptions are omitted.

After the tape was operated, the digital controller 54 detects two parameters $t_{a1}$ and $t_a$ in step F91 and determines the gain values $C_a$ and $C_b$ to correct the response in the transient state of the characteristic errors of the reel drive systems. Since the parameter $t_a$ which is used in this embodiment is the same as the parameter $t_a$ used in the embodiment in FIG. 1, its description is omitted. The new parameter $t_{a1}$ corresponds to the time required for the tape speed on the side of the take-up reel to reach the reference speed $V_s$. The parameter $t_{a1}$ satisfies the relation of the following expression (17) and the error coefficient $\beta_1$ of the take-up reel drive system can be detected.

$$K_0 \beta_1 t_{a1} = V_s (= K_0 t_s)$$

Therefore, $$\beta_1 = \frac{t_s}{t_{a1}} \quad (17)$$

where,
$\beta_1$: error coefficient on the side of the take-up reel
$K_0$: set acceleration
$t_{a1}$: measured acceleration time On the other hand, the error coefficient $\beta_2$ of the supply reel drive system can be detected from expression (16). Therefore, $t_{a1}$ and $t_a$ can be selected as parameters to extract the characteristic errors of the reel drive systems. A practical method of detecting two parameters $t_{a1}$ and $t_a$ will now be described in detail. However, the method of detecting $t_a$ is the same as that in the first embodiment; therefore, its description is omitted. The count value $n_3$ indicative of the tape speed on the side of the take-up reel is supplied to the operational unit 34 having the memory through the input port 72. The operational unit 34 compares a count value $n_{s1}$ which has previously been set into the memory and $n_3$ and measures the time when $n_3 \leq = n_{s1}$ is obtained as the number of clocks by use of the clocks (24). $n_{s1}$ is calculated by the following expression and set into the memory.

$$n_{s1} = \frac{2\pi R_1}{N K_0 t_{a1} t_s}$$

The operational unit 34 calculates and determines the gain values $C_a$ and $C_b$ to correct the response in the transient state in the characteristic errors of the reel drive systems by use of the detected parameters $t_{a1}$ and $t_{a2}$. The decided correction values $C_a$ and $C_b$ are set into the registers 36 and 37, respectively. A correction value $i_{tc}$ to correct the response in the stationary state in the characteristic errors of the reel drive systems is decided in a manner similar to the first embodiment; therefore, its description is omitted. In this way, two kinds of correction values to correct the characteristic errors of the reel drive systems are determined. The operational unit 34 makes the tape operative again by the new correction values, thereby checking to see if the adaptive correction has correctly been executed or not. The subsequent processes are the same as those in the first embodiment (FIG. 1); therefore, their descriptions are omitted.

In this embodiment, the characteristic errors of the reel drive systems are detected and extracted from the tachometer of the motor shaft, so that this detecting method is less likely to be influenced by the vibration of the mechanism section and the like and the detection accuracy is high. Therefore, the proper correction values can be decided. Further, the correction can be performed by a single tape operation.

As described above, according to the invention, proper drive command values to correct the characteristic errors of the reel drive systems are obtained, thereby driving the tape. Thus, the stable tape transport can be accomplished in a short time.

What is claimed is:
1. An apparatus for transporting a tape between two reels comprising:

a reel driving system including two motors for driving said reels, respectively and means for energizing said motors thereby effecting transportation of the tape between said reels, means for measuring an actual value of a tension applied to the tape during a transient period when the tape is mounted to the reels for transportation between them and its transportation speed is changed, and obtaining a tension deviation of the actual tension value from a desired tension value, means for calculating correction values of factors relating to determination of driving currents of said reel driving motors, respectively, as energized by said reel driving system, based on said tension deviation, means for storing said correction values of the factors to be used in a succeeding transportation of the tape, and means for correcting said factors based on said stored correction values, thereby correcting the driving currents of the respective reel motors in the succeeding transportation of the tape.

2. A tape transport apparatus according to claim 1, wherein in the case where said tension deviation exceeds a predetermined allowable value, said correction values of the factors are calculated.

3. A tape transport apparatus according to claim 1, wherein said tension deviation is repeatedly obtained during said transient period and an average of values of the tension deviation as obtained repeatedly is used for calculating the correction values of the factors.

4. An apparatus for transporting a tape between two reels comprising:

a reel driving system including to motors for driving said reels, respectively and means for energizing said motors thereby effecting transportation of the tape between said reels, means for measuring a time interval required for the tape to reach a predetermined reference speed from a given speed, while the tape is mounted to the reels for transportation between them, means for measuring an actual value of a tension applied to the tape during said time interval and obtaining a tension deviation of the actual tension value from a desired tension value, means for calculating correction values of factors relating to determination of driving commands to said reel driving motors, respectively, as energized by said reel driving system, based on said time interval and said tension deviation, means for storing said correction values to be used in a succeeding transportation of the tape, and means for correcting said factors based on said stored correction values, thereby correcting the driving commands of the respective reel motors in the succeeding transportation of the tape.

5. A tape transport apparatus according to claim 4, wherein the case where said tension deviation exceeds a predetermined allowable value, said correction values of the factors are calculated.

6. A tape transport apparatus according to claim 4, wherein said tension deviation is repeatedly obtained during said time interval and an average of values of the tension deviation as obtained repeatedly is used for calculating the correction values of the factors.

7. A method for controlling transportation of a tape between two reels in a tape transportation system comprising two motors for driving said reels, respectively and means for energizing said motors thereby effecting transportation of the tape, said method comprising the steps of:

measuring a time interval required for the tape to reach a predetermined reference speed from a given speed while the tape is mounted to the reels and the driving motors are energized for transportation of the tape between said reels, measuring the actual value of a tension applied to the tape during said time interval and obtaining a tension deviation of the measured tension value from a desired tension value, calculating correction values of factors relating to driving currents of said reel driving motors, respectively, as energized by said tape transportation system, based on said time interval and said tension deviation, storing said correction values to be used in a succeeding transportation of the tape, and correcting said factors based on said stored correction values, thereby correcting the driving currents of the respective reel motors in the succeeding transportation of the tape.

8. A tape transport method according to claim 7, wherein in the case where said tension deviation exceeds a predetermined allowable value, said correction values of the factors are calculated.

9. A tape transport method according to claim 7, wherein said tension deviation is repeatedly obtained during said time interval and an average of values of the tension deviation as obtained repeatedly is used for calculating the correction values of the factors.

10. A tape transport method in a tape transport apparatus of the type which comprises two reels on which the tape is mounted for transport therebetween, driving motors for driving the reels, respectively, motor driving means for energizing said motors based on driving commands applied thereto and means for calculating and controlling said driving commands based on tape radial of said reels, said tape transport method comprising the steps of:

obtaining an interval required for one of the reels to reach a predetermined reference speed from stop state upon starting the tape to move for transport between the reels and an average tension error of said tape within said time interval;

calculating acceleration errors of two reel drive systems by use of said time interval and said average tension error, respectively; and correcting said drive commands to be applied to said motor driving means so as to eliminate said acceleration errors in a subsequent transport of the tape.

11. A method for controlling transportation of a tape between two reels in a tape transportation system comprising two motors for driving said reels, respectively and means for energizing said motors thereby effecting transportation of the tape, said method comprising the steps of:

measuring an actual value of a given operation parameter of said tape transportation system during a transient period when the tape is mounted to the reels for transportation between them and its transportation speed is changed, calculating correction values of factors relating to driving currents of said reel driving motors, respectively, as energized by said tape transportation system, based on said measured actual value of said given operation parameter, storing said correction values to be used in a succeeding transportation of the tape, and correcting said factors based on said stored correction values, thereby correcting the driving currents of the respective reel motors in the succeeding transportation of the tape.

12. A method according to claim 11, wherein said step of calculating the correction values is repeated until a value less than a predetermined allowable value is obtained in measurement of said actual value of said given operation parameter.

13. An apparatus for transporting a tape between two reels, comprising:

reel motors for driving said reels, respectively, first means responsive to driving current commands applied thereto to supply driving currents corresponding to said commands, respectively, to said motors, second means for calculating said driving current commands based on a plurality of operating factors and applying said calculated current commands to said first means, third means for obtaining a value of at least one operating parameter representing condition of the transportation of the tape while the tape is mounted to said reels and the motors are energized for transportation of the tape between the reels, fourth means for correcting at least a part of said operating factors so as to reduce a deviation of the value of said operating parameter from a predetermined reference value thereof, fifth means for calculating said current commands based on said corrected operating factors and applying said corrected current commands to said first means in a succeeding transportation of the tape.

14. An apparatus according to claim 13, wherein the value of said one operating parameter is obtained by said third means repeatedly during a time interval required for the tape to reach a predetermined reference speed from a stop state.

15. An apparatus according to claim 13, wherein the value of said one operating paramenter is obtained while the transportation speed of the tape is changed.

16. An apparatus according to claim 15, whrein the value of said one operating parameter is obtained at a predetermined number of times while the transportation speed of the tape is changed and the values of said one operating parameter obtained at the respective times are used by said fourth means for correcting at least a part of said operating factors.

17. An apparatus according to claim 15, wherein the value of said one operating parameter is obtained periodically at a predetermined time interval after the tape starts to change its speed.

18. An apparatus according to claim 13, wherein said first means includes power amplifiers for supplying the driving currents proportional to said current commands to said motors, respectively.

19. An apparatus according to claim 18, further comprising a tension detector for detecting a value of a tension applied to the tape, a correcting filter for obtaining a deviation of the tension value detected by said tension detector from a predetermined reference tension value and removing from said tension deviation high frequency components and means for feeding back said tension deviation with high frequency components removed to at least one of said power amplifers thereby controlling the reel motor energized by said one power amplifier so as to maintain the tension applied to the tape at the reference tension value.

20. An apparatus according to claim 13, wherein said one operating parameter is a tension applied to the tape transported between said reels.

21. An apparatus for transporting a tape between two reels comprising:

reel driving motors for driving the reels, respectively, first means for supplying driving currents to the motors, respectively, second means including tachometers connected to the reel motors, respectively, each of said tachometers generating pulses correspondingly to an amount of rotation of the associated motor, for calculating an amount of the tape wound on each of the reels based on the pulses generated by the associated tachometer, third means for detecting a value of a tension applied to the tape while the tape is mounted to the reels for transportation between the reels, fourth means for producing current commands for the respective driving currents to be supplied to said reel motors based on the amount of the tape wound on each of the reels as calculated by said second means, a desired value of the tension applied to the tape and a desired tape speed in its transportation between the reels and supplying said current commands to said first means, fifth means for determining a deviation of the tension value detected by said third means from the desired tension value while the reel motors are driven by driving currents supplied by said first means so that the tape is transported between the reels, sixth means for correcting said current commands produced by said fourth means based on said tension deviation so that said corrected current commands are supplied by said fourth means to said first means in a succeeding transportation of the tape.

22. An apparatus according to claim 21, wherein the correction of said current commands is carried out by correcting factors used for calculating said current commands in said fourth means.

23. An apparatus according to claim 21, wherein said tension value is detected by said third means while the tape is transported between the reels and the transportation speed of the tape is changed.

24. An apparatus according to claim 21, wherein said third means detects the tension at a number of times during a time interval in which the tape is accelerated from a first speed to a second speed and said fifth menas calculates said tension deviation based on the values of tension detected at the respective times.

25. An apparatus according to claim 21, further comprising feeding-back means for feeding back the tension deviation determined by said fifth means to said first means so that said first means acts to control said current commands so as to reduce said tension deviation.

26. An apparatus for transporting a tape between two reels comprising:

reel driving motors for driving the reels, respectively, first means for supplying driving currents to the motors, respectively, second means for obtaining an amount of the tape wound on each of the reels, third means for detecting a value of a tension applied to the tape while the tape is mounted to the reels for transportation between the reels, fourth means for producing current commands for the respective driving currents to be supplied to said reel motors based on the amount of the tape wound on each of the reels as obtained by said second means, a desired value of the tension applied to the tape, a desired tape speed in its transportation between the reels and operating factors and for supplying said current commands to said first means, fifth means for determining a deviation of the tension value detected by said third means from the desired tension value while the reel motors are driven by driving currents supplied by said first means so that the tape is transported between the reels, sixth means for correcting at least one of said operating factors therby correcting said current commands produced by said fourth means so as to reduce said tension deviation so that said corrected current commands are supplied by said fourth means to said first means in a succeeding transportation of the tape.

27. An apparatus according to claim 26, wherein the tension value is detected at a number of times while the tape speed is changed from a first speed to a second speed.

28. An apparatus according to claim 26, wherein the tension value used for determining the tension deviation by which said at least one operating factor is corrected is one which is detected when the rate of change of the tape speed is large.

29. An apparatus according to claim 23, further comprising means for causing said first means to control said driving currents so as to compensate for said tension deviation.

30. An apparatus for transporting a tape between two reels comprising:
a reel driving system including reel driving motors for driving the reels, respectively, and first means for supplying driving currents to said reel motors, respectively, based on current commands applied thereto, second means for determining said current commands by using a plurality of operating factors, third means for detecting a value of a tension applied to the tape while the tape is mounted to the reels and the reel motors are driven for transportation of the tape between the reels, fourth means for measuring a time interval at which the tape speed is changed from a first speed to a second speed, as the tape is transported between the reels, fifth means for determining whether there exists any error in operation of said reel driving system based on said detected tension value and said measured time interval and correcting, if it is determined that there exists any error in said reel driving system, at least one of said operating factors based on said detected tension value thereby correcting said current commands which are applied to said first means to said reel motors are corrected in the succeeding transportation of the tape so as to compensate for the error in said reel driving system.

31. An apparatus according to claim 30, wherein whether there exists any error in said reel driving system is detremined depending on whether the time interval measured by said fourth means is within a predetrmined allowable range.

32. An apparatus according to claim 30, wherein whether there exists any error in said reel driving system is determined depending on whether a deviation of the tension value detected by said third means from a predetermined reference value of the tension is within a predetermined allowable range.

33. An apparatus according to claim 30, wherein, when a deviation of the tension value detected by said third means from a predetermined reference value of the tension is within a predetermined allowable range, whether there exists any error in said reel driving system is determined depending on whether the time interval measured by said fourth means is within a predetermined allowable range.

34. An apparatus according to claim 30, wherein said tension value used for correcting said at least one operating factor is one detected when the rate of change of the tape transportation speed is large.

35. n apparatus according to claim 30, wherein said second means and said fifth means are incorporated in one digital controller.

36. An apparatus according to claim 30, further comprising means for calculating a deviation of the tension value detected by said third means from a predetermined reference value of the tension and means for causing said first means to control said driving currents so as to reduce said tension deviation.

37. A method for controlling transportation of a tape between two reels in a tape transportation system comprising two motors for driving said reels, respectively, and motor driving means for supplying driving currents to said motors for transportation of the tape between the reels, said method comprising:
a first step of calculating current commands to be applied to said motor driving means for controlling said driving currents by using a plurality of operating factors, a second step of detecting a physical quantity representing a condition of the transportation of the tape, while the tape is mounted to the reels and the reel motors are driven for transportation of the tape between the reels, a third step of determining whether there exists any error in operation of said tape transportation system based on said detected physical quantity and correcting, if an existence of any error is determined, at least one of said operating factors thereby correcting said current commands so as to eliminate the error in operation of said reel driving system, and a fourth step of applying said corrected current commands to said motor driving means in a succeeding transportation of the tape between the reels.

38. A method according to claim 37, wherein said first, second, third and fourth steps are repeated until the physical quantity detected by said second step falls within a predetermined allowable range.

39. A method according to claim 37, wherein said physical quantity includes at least one of a tension applied to the tape as transported between the reels, a time interval required for the tape to reach a predetermined reference speed from a given speed and a set of values representing amounts of rotation of the reel motors, respectively.

40. A method according to claim 37, wherein said physical quantity is detected at a number of times in the second step while the tape transportation speed is changed, and the correction of said at least one operating factor is carried out based on the values of said physical quantity detected at the respective times.

41. A method according to claim 40, wherein, in the second step, said physical quantity is detected periodically at a predetermined time interval after the tape starts to change its speed.

42. A method for controlling transportation of a tape between two reels in a tape transportation system comprising two motors for driving said reels, respectively, and motor driving means for supplying driving currents to said motors for transportation of the tape between the reels, said method comprising:

a first step of calculating an amount of the tape wound on each of the reels based on pulses produced correspondingly to the rotation of each of the motors, a second step of determining current commands indicative of said driving currents to be supplied to the respective motors based on said amount of the tape wound on each of said reels, a desired value of the tension and a desired speed in transportation of the tape, a third step of detecting a value of a tension applied to the tape, while the tape is mounted to the reels and the motors are driven by said driving currents for transportation of the tape between the reels, a fourth step of obtaining a deviation of the tension value detected by the second step from the desired value of the tension, a fifth step of determining an error in said tape transportation system depending on said tension deviation and calculating correction of said current commands which would be effective to cancel said error in said tape transportation system, and a sixth step of applying said corrected current commands to said motor driving means in a succeeding transportation of the tape between the reels.

43. A method according to claim 42, wherein said first, second, third and fourth steps are repeated until said tension deviation obtained by said fourth step falls within a predetermined allowabe range.

44. A method according to claim 42, wherein, in the third step, the tension is detected while the transportation speed of the tape is changed as transported between the reels.

45. A method for controlling transportation of a tape between two reels in a tape transportation system comprising two motors for driving said reels, respectively, and motor driving means for supplying driving currents to said motors for transportation of the tape between the reels, said method comprising:

a first step of calculating current commands indicative of said driving currents to be supplied to said motors by using a plurality of operating factors, a second step of detecting a value of a tension applied to the tape, while the tape is mounted on the reels and the motors are driven for transportation of the tape between the reels, a third step of measuring a time interval required for the tape to change its speed from a first speed to a second speed, while the tape is mounted on the reels and the motors are driven for transportation of the tape between the reels, a fourth step of determining that there exists an error in said tape transportation system depending on said detected tension value and said measured time interval, a fifth step of correcting at least one of the operating factors so as to cancel the error in said tape transportation system based on said detected tension value and said measured time interval, and a sixth step of calculating new current commands by using the corrected operating factors and applying said new current commands to said motor driving means in a succeeding transportation of the tape between the reels so that said motors are driven by new driving currents represented by said new current commands.

46. A method according to claim 45, wherein said second, third, fourth, fifth and sixth steps are repeated until the measured time interval falls within a predetermined allowable range.

47. A method according to claim 45, wherein said second, third, fourth, fifth and sixth steps are repeated until a deviation of the detected tension value from a desired value of the tension falls within a predetermined allowable range.

48. A method according to claim 45, wherein said second, third, fourth, fifth, and sixth steps are repeated until a deviation of the detected tension value from a desired value of the tension falls within a predetermined allowable range of the tension deviation and also the measured time interval falls within a predetermined allowable range of the time interval.

49. A method for controlling transportation of a tape between two reels in a tape transportation system comprising two motors for driving said reels, for rotation, respectively, and motor driving means for supplying driving currents to said motors for transportation of the tape between the reels, said method comprising:

a first step of determining an amount of the tape wound on each of the reels, a second step of calculating currents commands indicative of said driving currents to be supplied to the respective motors based on said amount of the tape wound on each of said reels, a desired value of the tension and a desired speed in transportation of the tape and a plurality of operating factors, a third step of detecting a value of a tension applied to the tape, while the tape is mounted to the reels and the motors are driven by said driving currents for transportation of the tape between the reels, a fourth step of determining an error in said tape transportation system depending on said detected tension value and correcting at least one of said operating factors so as to cancel said error in said tape transportation system, and a fifth step of repeating said first to fourth steps in a succeeding transportation of the tape between the reels, while substituting the operating factors with the corrected operating factors.

* * * * *